(12) United States Patent
Ray

(10) Patent No.: US 6,192,257 B1
(45) Date of Patent: *Feb. 20, 2001

(54) WIRELESS COMMUNICATION TERMINAL HAVING VIDEO IMAGE CAPABILITY

(75) Inventor: Rajarshi Ray, Princeton, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/052,820

(22) Filed: Mar. 31, 1998

(51) Int. Cl.[7] .................................................. H04M 1/00
(52) U.S. Cl. ............................ 455/566; 455/575; 348/14; 348/15
(58) Field of Search .................................... 455/422, 414, 455/566, 575; 348/14, 15, 16, 13, 17, 207, 552; 370/335, 342, 344, 320

(56) References Cited

U.S. PATENT DOCUMENTS

| | | | |
|---|---|---|---|
| 4,827,499 | 5/1989 | Warty et al. ............................ | 379/58 |
| 5,404,170 | * 4/1995 | Keating ................................. | 348/443 |
| 5,491,507 | * 2/1996 | Umezawa et al. ...................... | 348/14 |
| 5,793,416 | * 8/1998 | Rostoker et al. ....................... | 348/17 |
| 5,835,480 | * 11/1998 | Chennakeshu ......................... | 370/206 |
| 5,835,487 | * 11/1998 | Campanella .......................... | 370/316 |
| 5,883,899 | * 3/1999 | Dahlman et al. ..................... | 370/468 |
| 5,894,473 | * 4/1999 | Dent ..................................... | 370/342 |
| 5,896,368 | * 4/1999 | Dahlman et al. ..................... | 370/335 |
| 5,929,934 | * 7/1999 | Nakasaka et al. .................... | 348/590 |

OTHER PUBLICATIONS

Dana H. Ballard et al., "Computer Vision", New Jersey: Prentice–Hall, 1982, pp. 35–42.
William K. Pratt, "Digital Image Processing", New York: John Wiley & Sons, 1978, pp. 93–111,616–626.
A. Murat Tekalp, "Digital Video Processing", New Jersey: Prentice Hall PTR, 1995, pp. 360–366.
W. R. Young, "Advanced Mobile Phone Service", New Jersey: AT&T, The Bell System Technical Journal, vol. 58, No. 1, Jan. 1979, pp. 1–14.
V. H. MacDonald, "The Cellular Concept", New Jersey: AT&T, The Bell System Technical Journal, vol. 58, No. 1, Jan. 1979, pp. 15–41.
Kyung Sub Joo, et al., "ADPCM Encoding of Images Using a Conjugate Gradient Based Adaptive Algorithm", New Jersey: IEEE ICASSP 1996 Conference Proceedings, vol. 4 pp. 1942–1946.

* cited by examiner

Primary Examiner—Dwayne Bost
Assistant Examiner—Temica M. Davis
(74) Attorney, Agent, or Firm—S. Williamson; T. J. Bean

(57) ABSTRACT

A wireless communication terminal is configured for enabling a user to receive and transmit video images as well as receive and transmit audio or speech signals associated with the user of the terminal and another user at, for example, a remote location. The received video image is obtained from a video image signal received over a radio frequency communications link established between the wireless communication terminal and a cellular base station. This received video image is displayed in a video image display conveniently associated with the wireless communication terminal. The transmitted video image signal may be that of the user of the terminal, of a scene within the field of view of the video camera or of text either coupled to the terminal through one of many well known data interfaces, or an image of text as captured by the camera. This transmitted video image signal is obtained from a video camera associated with the wireless communication terminal and then transmitted over the radio frequency communications link established between the wireless communication terminal and the cellular base station for displaying in a remotely located video image display.

19 Claims, 5 Drawing Sheets

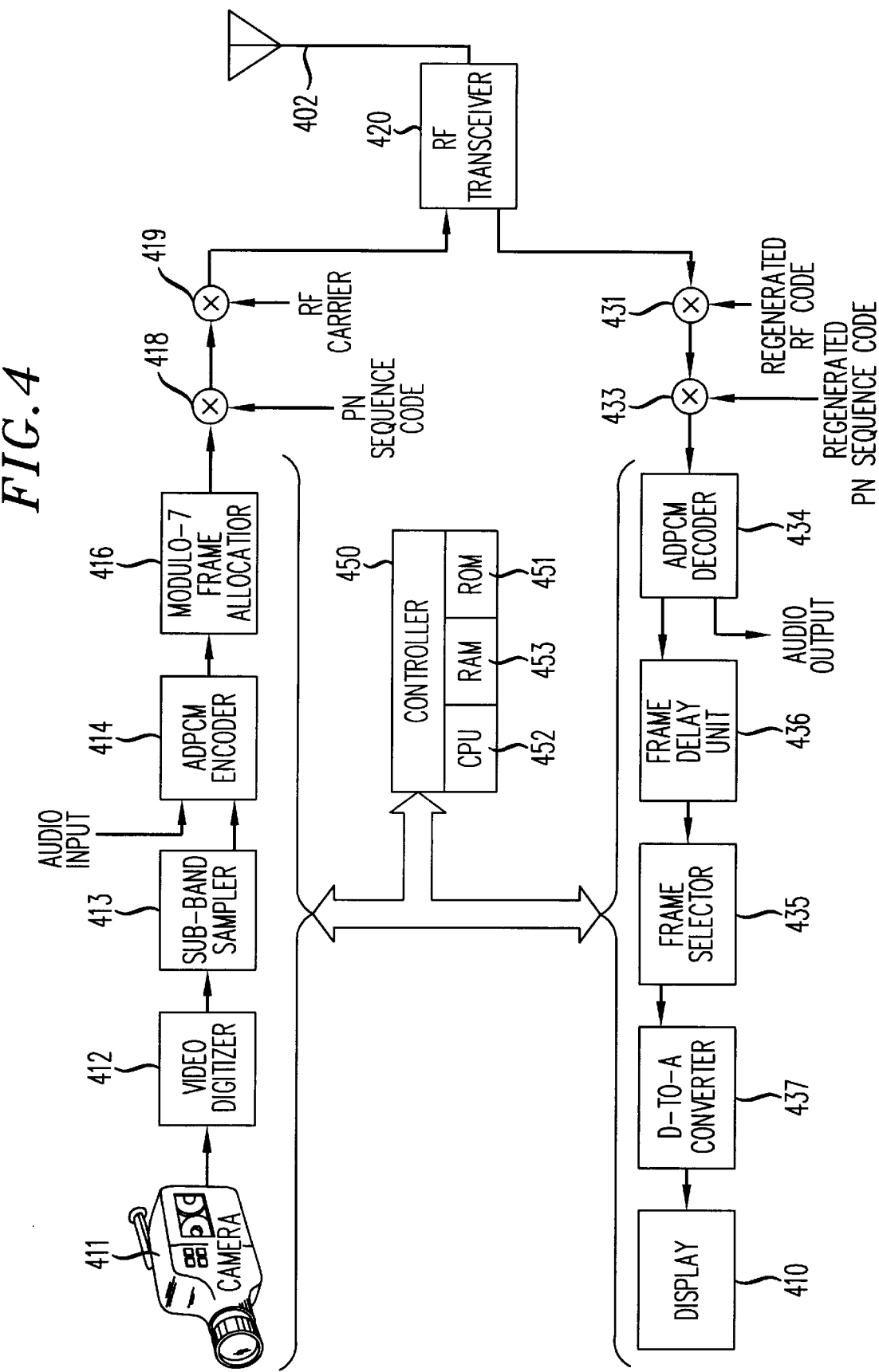

WIRELESS COMMUNICATION TERMINAL HAVING VIDEO IMAGE CAPABILITY

BACKGROUND OF THE INVENTION

1. Technical Field

This invention relates to wireless communication terminals arranged for operation in wireless communication systems and more particularly to a wireless communication terminal arranged for receiving and transmitting large amounts of data in a wireless communication system.

2. Description of the Prior Art

Wireless telecommunication networks have grown very rapidly in the past decade as a result of substantial breakthroughs in the cost of wireless communication terminals, otherwise known as mobile stations. Such mobile stations exist in many forms from those which are mounted in automobiles to portable stations to hand held stations. Most of the wireless networks in use today are structured as one of existing cellular systems.

Various types of cellular systems have been described which provide radio telephone service to a large number of mobile subscribers using a relatively small number of frequencies. Such service is provided by dividing a service area into a number of cells and reusing the frequencies in non-adjacent cells. This cellular principle has permitted a large growth in the amount of wireless telecommunications that can be carried over the allocated radio spectrum thus allowing a huge growth in the number of wireless communication subscribers. One cellular system is described in *The Bell Systems Technical Journal,* Volume 58, January 1979, Number 1, particularly in papers entitled *Advanced Mobile Phone Service: Introduction, Background and Objectives* by W. R. Young and *The Cellular Concept* by V. H. MacDonald. Another cellular system is a digital system which is based upon time division multiple access (TDMA) techniques and is defined in Telecommunications Industry Association Interim Standard (TIA IS) 54. Yet another cellular system employs code division multiple access (CDMA) techniques and is defined in TIA IS-95. Still another cellular system combines TDMA and frequency division multiple access (FDMA) techniques and is known as the global system for mobile communication (GSM) which was developed by Groupe Special Mobile of the European Conference of Posts and Telecommunications (CEPT) and its successor, the European Telecommunications Standard Institute (ETSI).

While major technological breakthroughs have occurred in wireless communication terminals for communicating within cellular systems, many features, which now have become available to a telephone user at a residence or office, still remain unavailable to a user of a wireless communication terminal. Such features are available to the telephone user at the residence or office primarily because the user's telephone connects directly to a subscriber wire line. It is now desirable, and also technically feasible, for more of these features to be made available to a user of a wireless communication terminal.

SUMMARY

One desirable feature for a wireless communication terminal user to have available in his or her terminal is a video image capability. This need is met in accordance with a first illustrative embodiment wherein a wireless communication terminal is configured for receiving and displaying a video image therein. This video image is obtained from a video image signal received over a radio frequency communications link established between the wireless communication terminal and a cellular base station. The video image is displayed in a video image display conveniently associated with the wireless communication terminal.

The foregoing need is further met in accordance with a second illustrative embodiment wherein the wireless communication terminal is configured for originating and transmitting therefrom a video image signal. Such video image signal is obtained from a video camera associated with the wireless communication terminal and then transmitted over the radio frequency communications link established between the wireless communication terminal and the cellular base station for displaying in a remotely located video image display.

The wireless communication terminal configuration and method enable a user to receive and transmit video images as well as receive and transmit audio or speech signals associated with the user of the terminal and another user at, for example, a remote location. The transmitted video image signal may be that of the user of the terminal, of a scene within the field of view of the video camera or of text either coupled to the terminal through one of many well known data interfaces, such as an RS-232 interface, or an image of text as captured by the camera.

BRIEF DESCRIPTION OF THE DRAWINGS

Further features and advantages of the present invention will become apparent from the following detailed description taken together with the drawings in which:

FIG. 4 shows a general block diagram of alternative selected circuitry for a mobile radio telephone set, operative in accordance with the principles of the present invention.

Throughout the drawing, the same element when shown in more that one figure is designated by the same reference numeral.

DETAILED DESCRIPTION

Figure 1:
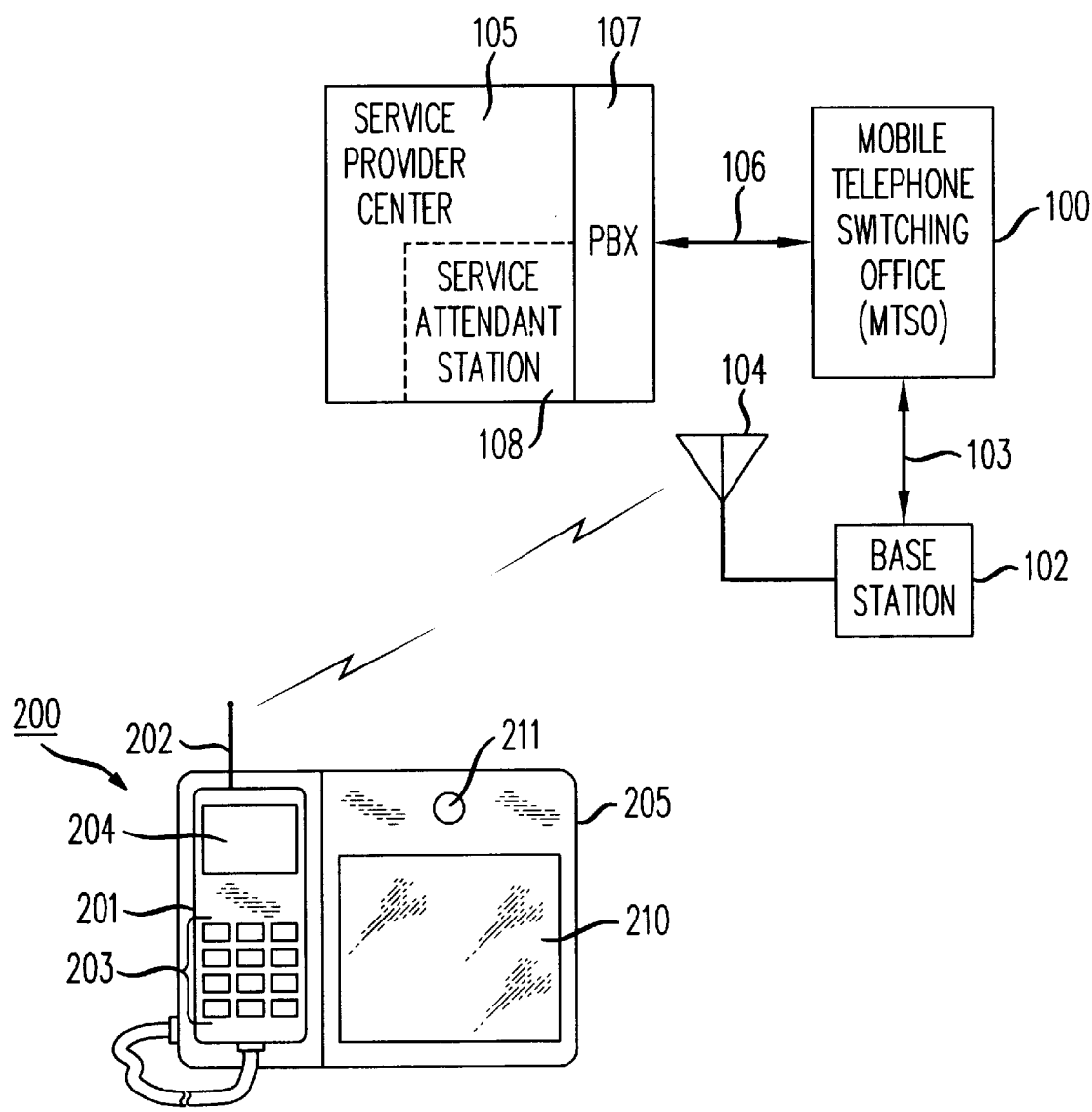
FIG. 1 is a schematic block diagram configuration of a mobile radio telephone communication configuration in accordance with an embodiment of the invention.

Shown in FIG. 1 is a schematic representation of a mobile radio telephone communication configuration which illustratively includes a mobile telephone switching office (MTSO) 100 adapted to link a wireless communication terminal or mobile radio telephone set 200 into a regional or nationwide telephone network (not shown). A cellular base station 102, coupled to the MTSO 100 via a bi-directional voice and data communication link 103, is arranged to be in radio frequency communication with the mobile radio telephone set 200 via a radio frequency (RF) antenna 104. Also shown in schematic form is a cellular communications service provider center 105 adapted to be coupled to the MTSO 100 via another bidirectional voice and data link 106.

The service provider center 105 includes, inter alia, a telephone private branch exchange (PBX) 107, and a service attendant station 108 coupled to the PBX 107. The telephone switching office, base station 102, and PBX 107 all may be part of an Autoplex® 1000 system such as that described in U.S. Pat. No. 4,827,499.

As shown, the mobile radio telephone set 200 comprises a handset unit 201 with an RF antenna 202, a keypad 203 and a dial display 204. The mobile radio telephone set 200 also comprises a portable base unit 205 that is shown illustratively connected to the handset unit 202 by way of a cord 207 for providing the necessary data transfer between these two units. Alternatively, a cordless radio frequency video link may be used in communications between the handset unit 201 and the portable base unit 205. As appreciated by those skilled in the art, such technique is known and presently available commercially in many remote video monitoring systems, an example of which is the video-based baby monitor available from Fisher-Price. Included in the portable base unit 205 is a display 210 for showing a received visual image and also a camera 211 for capturing a visual image for transmission to a remote display device (not shown) through the radio frequency communication with the cellular base station 102. The display 210 may typically be a liquid crystal device (LCD) display and the camera 211 may typically be constructed using charged-coupled devices (CCDs).

The principles and features of the present invention shall be hereafter described in connection with the mobile radio telephone set 200, shown in FIG. 1. This mobile radio telephone set 200 is capable of receiving and transmitting audio or speech signals and, in accordance with the disclosed embodiment, signals from a video image, as well. The video image may be that of the user of the mobile radio telephone set, of a scene within the field of view of a camera associated with the telephone set 200 or of text either coupled to the set through one of many well known data interfaces, such as an RS 232 interface, or an image of text as captured by the camera.

The arrangement for simultaneous transmission and reception of video and speech is achieved through use of the Electronic Industries Association/Telecommunications Industry Association/Interim Standard 95 entitled *Mobile Station-Base Station Compatibility Standard for Dual-Mode Wideband Spread Spectrum Cellular System,* March 1993. The mobile radio telephone set 200 may advantageously be configured for operation in this digital wideband CDMA system in either the cellular (850 MHz) or personal communication system (PCS) (1.9 GHz) range. It is to be understood, however, that this arrangement may be similarly employed in other systems wherein the functions and features of this arrangement may be accommodated.

Figure 2:
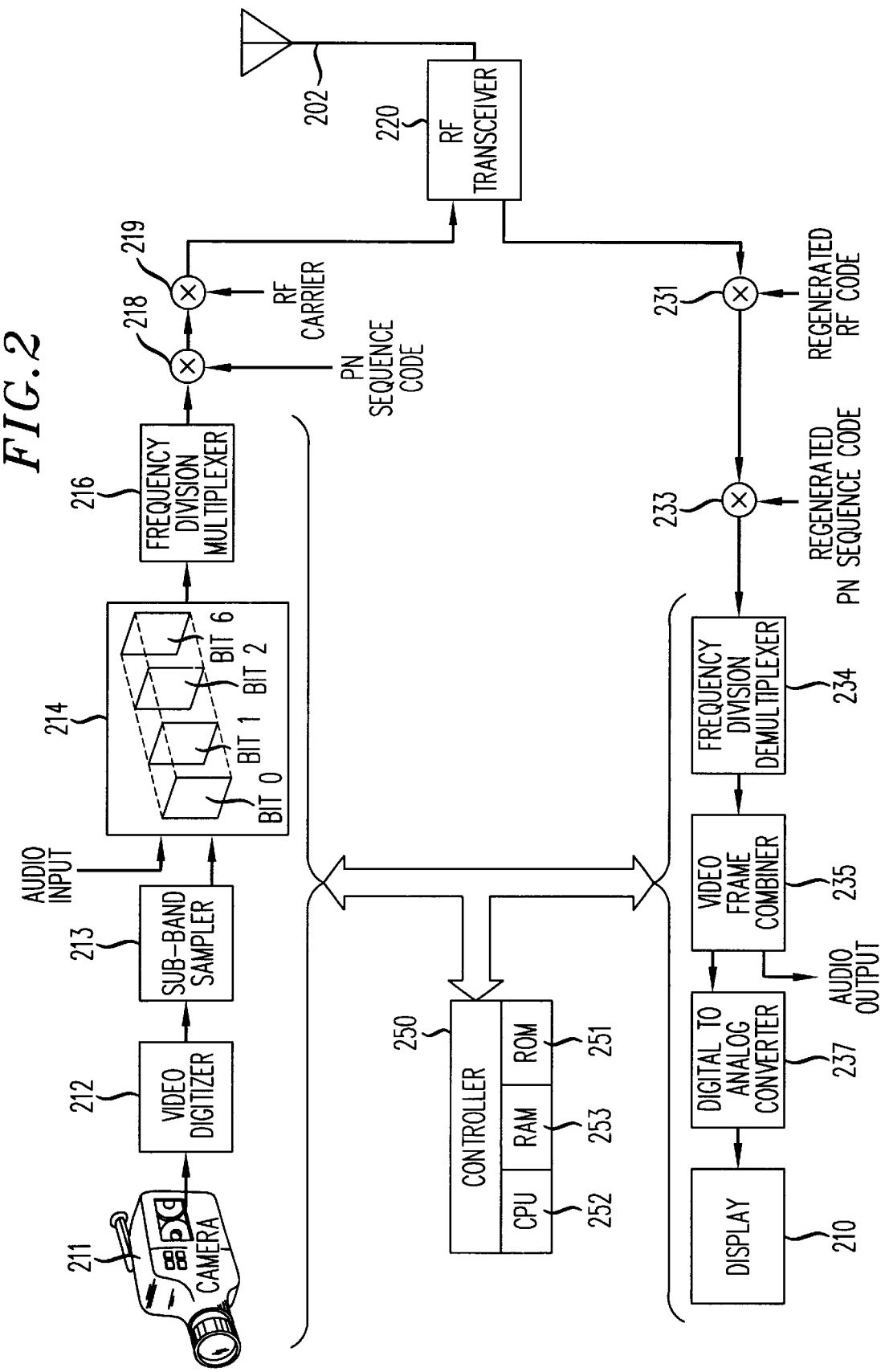
FIG. 2 shows a general block diagram of selected circuitry for a mobile radio telephone set, operative in accordance with the principles of the present invention.

Referring next to FIG. 2, there is shown a general block diagram of selected circuitry located in the mobile radio telephone set 200. As shown, the transmitter section of this telephone set includes camera 211 for acquisition of the video image. A camera usable as camera 211 may be obtained from Sony or from Cohu as Model Number 6600 or from Hitachi as Model Number KP-16. The camera 211 captures the image which is subsequently digitized and quantized in a video digitizer 212 as a 512×512×8 bit gray scale image frame. The video digitizer 212 performs an analog-to-digital conversion of the incoming signal with these images being obtained continuously at the rate of 30 frames per second. Video digitizers are commercially available for performing the function of digitizer 212. One such digitizer currently available from Matrox Electronic System is the Meteor-II series PCI frame grabber. Although the methodology as presently described, is for gray scale images, it is understood that one skilled in the art could extend this methodology such that color images are generated and processed.

After digitization in the digitizer 212, each image is passed through a sub-band sampler 213 which operates as a digital low pass filter for reducing the images into 128×128×6-bit frames. Sub-band samplers as well as video digitizers are known in the art and may be constructed using the teaching of either William K. Pratt as described in *Digital Image processing,* Second edition, Wiley, 1991 or Dana H. Ballard et al. as described in *Computer Vision,* Prentice-Hall, 1982. The bit frames from the sub-band sampler 213 are coupled to a bit slicer 214 where they are parsed into bit-sliced frames, corresponding to the $0^{th}$ bit through the $5^{th}$ bit. The audio input at the radio telephone set 200 is also provided to an input of the bit slicer 214 where it also becomes one of the bit-sliced frames, which corresponds to the $6^{th}$ bit. Bit slicers are known in the art and may be constructed using the teaching of Azriel Rosenfeld, et al. as described in *Digital Picture Processing,* Second Edition, Volumes 1 and 2, Academic Press, 1981. At this stage in the circuitry of the telephone set 200, the video signal has been split into six different video signals of 128×128×1 bit×30 per second along with a similar structured audio signal, each signal requiring a bandwidth of approximately 0.5 MHz.

Figure 3:
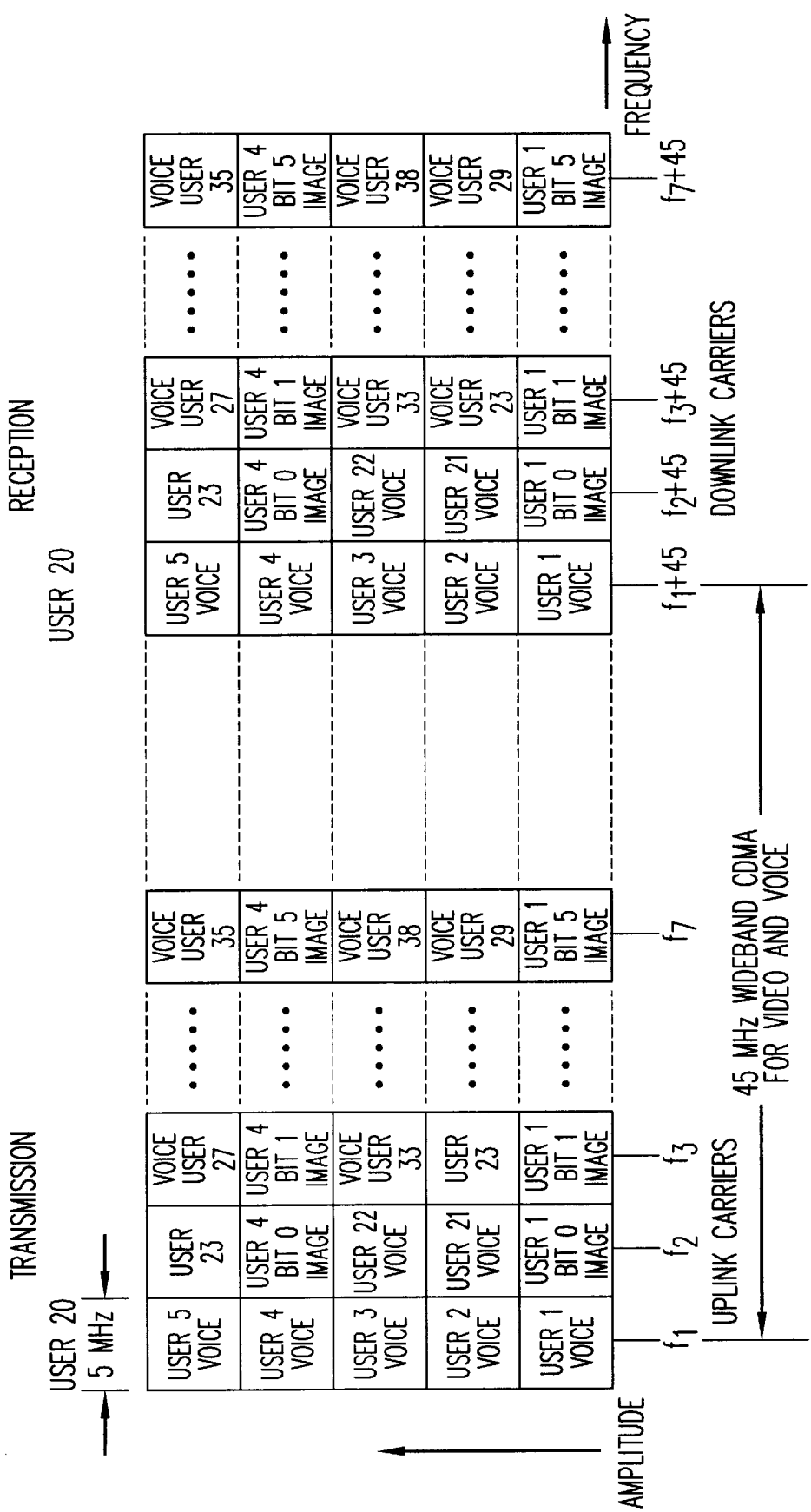
FIG. 3 shows a frequency allocation table for signals in a cellular system including those signals generated in and received by the mobile radio telephone set, in accordance with the principles of the present invention.

From the bit slicer 214, the bit sliced frames are coupled to a frequency division multiplexer 216 where a different RF carrier frequency is assigned to each of the six video signals and a separate carrier frequency also assigned for the transmission of the speech signal from the telephone set 200. From the multiplexer 216, each video signal is coupled to and multiplied by a pseudo noise (PN) sequence code in a spreader 218 which is employed in a conventional manner in a wideband CDMA system. This PN sequence code may be at either 5 MHz, 10 MHz or 15 MHz in accordance with the IS 95 CDMA common air interface. Each data signal is next modulated in an RF modulator 219, amplified in a transmitter portion of transceiver 220 and transmitted over antenna 202. As illustratively described in FIG. 2, a single phone call containing video and audio information is transmitted by the telephone set 200 as seven different signals, six for video and one for voice. FIG. 3 shows a frequency allocation table of the video and audio signals for the mobile radio telephone set 200 as they may be distributed in a CDMA system along with signals from other mobile station users also operating in this system. Since ample bandwidth is available in the CDMA system, no video compression needs to be employed in the transmission of the signal, as illustrated by this embodiment of the radio telephone set 200.

Also shown in FIG. 2 is a receiver section for the radio telephone set 200. A signal designated for receipt by the telephone set 200 is received in a receiver portion of the RF transceiver 220 and coupled to an RF demodulator 231 where the RF carrier is regenerated. From the demodulator 231, the received signal is coupled to a de-spreader 233 wherein the PN sequence codes for the video signals are regenerated. From the de-spreader 233, the signals are coupled to a frequency division demultiplexer 234 which provides 7-bit sliced frames for coupling to the video frame combiner 235. The video frame combiner 235 performs the opposite role of the bit slicer 214 and its operation is similar to the algorithms described by Azriel Rosenfeld, et al. in *Digital Picture Processing,* Second Edition, Volumes 1 and 2. In the video frame combiner 235, the 7-bit sliced frames are combined into a two dimensional array of N-bit frames or 128×128 by 7-bit frames with one of these frames being coupled in a conventional manner to audio input circuitry (not shown) in the telephone and the other 6-bit frames being coupled to a digital-to-analog converter 237. At this converter, the 6-bit frame signals are converted from a digital form to an analog form for generating the video image signal. From the converter 237, the video image signal is coupled to the display 210.

The mobile radio telephone set 200 also includes a controller unit 250, as shown in FIG. 2. This controller unit 250 includes a program memory 251 which provides instructions to a central processor unit (CPU) 252 for controlling the various operating features and functions originating at the telephone set 200. This program memory 251 contains data for interpreting a plurality of codes representative of various control signals received from the cellular base station 102 and for generating codes to be transmitted to the base station 102, for suitable operation of the mobile radio telephone set 200 in the CDMA system. A data memory 253 is utilized by the CPU 252 for storing and accessing data associated with performing the various functions and features programmed in the program memory 251. In the described embodiment, CPU 252 is a microprocessor, program memory 251 is read-only-memory (ROM) and data memory 253 is random-access-memory (RAM). These components are readily available from a number of semiconductor manufacturers such as Intel, Motorola, AMD and NEC.

Referring next to FIG. 3, the uplink and downlink frequency carriers for each of multiple users in a CDMA system are illustratively shown. The frequency carriers for the six video signals and one audio signal for the mobile radio telephone set 200 are depicted as they may be allocated in the CDMA system, along with the carriers of other users in this system, assuming a PN sequence code of 5 MHz. Specifically users 1 and 4 are illustratively shown employing mobile radio telephone sets of the type described herein as set 200. Users 1 and 4 therefore respectively occupy seven carriers in each link, six for the video image signal and one for the accompanying audio or speech signal. All other users on the system are illustratively shown in a conventional manner as having a single uplink and a single downlink carrier, i.e., only voice capability.

In the mobile radio telephone set 200, using the parameters described herein above for this set, the signal-to-noise ratio($S/N$) may be computed for the PN sequence frequencies for various numbers of users (m) in a system using this type of telephone set, as follows: (in terms of noise power)

$$\frac{S}{N} = \frac{G}{n} = 1 \bigg/ \frac{\text{signal b.w.}}{\text{noise b.w.}} = 1 \bigg/ \frac{0.5 \text{ MHz}}{5 \text{ MHz}} = 10 = 10 \text{ dB}$$

for a two user system, and $$\frac{S}{N} = \left[(\text{\# users} - 1)\left(\frac{0.5 \text{ MHz}}{5 \text{ MHz}}\right)\right]^{-1} = \left[\frac{3}{10}\right]^{-1} = \frac{10}{3} = 3.333 = 5 \text{ dB}$$

the signal to noise ratio is decreased as shown for four users.

It can be seen from the above that this system is capable of reasonably supporting four simultaneous users of mobile radio telephone sets having a video image capability in the manner of telephone set 200. A greater number of users may be realized by using either 1) a higher PN sequence frequency, such as 15 MHz (i.e., wideband CDMA), 2) video data compression or 3) a combination of both the higher PN sequence frequency and the video data compression.

If a PN sequence code of 15 MHz is used, then the signal to noise ratio can be computed as follows:

$$\frac{S}{N} = \frac{1}{(m-1)\left(\frac{0.5}{15}\right)}$$

$$\frac{S}{N} = 30 = 15 \text{ dB}$$

for m=two users, and $$\frac{S}{N} = \frac{1}{(8)\left(\frac{0.5}{15}\right)} = 3.75 \cong 6 \text{ dB}$$

for m=nine users.

Therefore, the signal quality is improved by about 3 times (S/N ratio of 30 instead of 10) at 15 MHz instead of at 5 MHz. Also, this frequency change causes the number of users to more than double (four users in the previous case to nine users in the present embodiment) at a S/N ratio of 5–6 dB.

The video data processed in the foregoing described embodiment of mobile radio telephone set 200 is not compressed by this telephone set. The description for this telephone set is therefore meant to be illustrative only of the principles of the present invention. As will become apparent to those skilled in the art, there are also alternative embodiments for a telephone set having a video image capability, in accordance with the principles of the invention. The cost and quality (signal-to-noise ratio) of a mobile radio telephone set having video image capability is improved by incorporating video data compression prior to transmission. If compression techniques such as adaptive differential pulse code modulation (ADPCM) or Huffman Coding are employed, such as will be described next herein with reference to FIG. 4, then the 6-bit video data employed in the foregoing described embodiment may be encoded in terms of only 2 bits. Moreover, processing of the data is further improved when video data compression is combined with a higher PN sequence frequency (wideband CDMA), as also described with reference to FIG. 4.

In FIG. 4 of the drawing, there is shown a general block diagram of selected circuitry for a mobile radio telephone set 400 which, like the mobile radio telephone set 200, has video image capability. Many of the same basic components are used in implementing the circuit embodiment of FIG. 4 for the telephone set 400 and the circuit embodiment of FIG. 2 for the telephone set 200. Because of this and the detailed description given the embodiment of FIG. 2, this telephone set embodiment will be described in similar detail only where the operation of the component sections differ substantially and sufficient clarity of operation might not be readily apparent from the description provided in the operation of the embodiment of the telephone set 200.

With reference next to FIG. 4, the transmitter section of this mobile radio telephone set 400 includes camera 411 for acquisition of the video image. Camera 411 captures the image which is subsequently digitized and quantized in a video digitizer 412 as a 512×512×8 bit image frame. The video digitizer 412 performs an analog-to-digital conversion of the incoming signal and the images are obtained continuously at the rate of 30 frames per second.

After digitization in the digitizer 412, each image is passed through a sub-band sampler 413 which operates as a digital low pass filter for reducing the images into 128× 128×6-bit frames. These bit frames from the sub-band sampler 213 are coupled to an ADPCM encoder 414 which encodes the 6-bit data in terms of only two bits in contiguous frames. Prior to encoding, the image intensity ranges from 0 to 63 at each picture element or pixel for 6-bit images. After encoding, the intensity ranges from 0 to 3 for the 2-bit images by retaining only the differential information among pixels rather than their original magnitudes. For this type of operation, an encoder described by K. S. Joo, D. R. Gschwind and T. Bose in the ICASSP 1996 Conference Proceedings, Volume 4, Page 1943–1946 and entitled *ADPCM Encoding of images using a Conjugate Gradient Based Adaptive Algorithm*, is suitable.

From the encoder 414, the 128×128 by 2-bit data is coupled to a modulo-N frame allocator 416 where N is equal to 7 and where frequency division multiplexing is applied to the contiguous frames. In contrast to the foregoing described embodiment of mobile radio telephone set 200, shown in FIG. 2, wherein frequency division multiplexing techniques are applied to 7-bit planes of single frames, in the embodiment of mobile radio telephone set 400, frequency division multiplexing is used on the contiguous frames themselves by the modulo-7 frame allocator 416, with each frame being configured in a 2-bit compressed format.

The modulo-7 scheme allocates different RF carriers to different frames. Six carriers are allocated for full video and one dedicated carrier is allocated for speech or audio signals. This set of seven frames (frame 0 through frame 6) are transmitted in parallel by respectively using seven RF carriers. Subsequently, the next set of frames, that is, frame 7 through frame 13, are transmitted using these same seven carriers. Thus, by way of example, frame 0, frame 7, frame 14, etc. will be allocated the same RF carrier but in different time slots.

By the above described process, modulo-7 allocation of RF carriers to frames and data compression are advantageously employed. The same RF carriers are used repeatedly for enabling the required number of these carriers for transmission of the signal to be kept to a minimum. And data compression achieves the desired bandwidth reduction albeit at a certain cost, i.e., the computational complexity involved and reduction in quality of the overall image. Empirical studies have shown, however, that image quality need not be great for a viewer using a screen having a size that typically would be employed in a radio telephone set, such as that described herein. Moreover, it is to be understood that if a high resolution image is desired in a radio telephone set, such image could easily be realized by one skilled in the art by employing the principles of the invention disclosed herein.

From the modulo-7 frame allocator 416, each video signal is coupled to and multiplied by a pseudo noise (PN) sequence code in a spreader 418. In keeping with the notion of illustrating the data compression and wideband width capabilities of this embodiment, the PN sequence code is selected to be at 15 MHz in accordance with the IS 95 CDMA common air interface. Optionally, it may also be set at 5 MHz or 10 MHz if one of these is the designer's preference, however. From the spreader 418, each data signal is coupled to and modulated in a conventional manner in an RF modulator 419, then amplified in a transmitter portion of transceiver 420 and, finally, transmitted over antenna 402.

Also shown in FIG. 4 is a receiver section for the radio telephone set 400. A signal designated for the telephone set 400 is received in a receiver portion of the RF transceiver 420 and coupled to an RF demodulator 431 where the RF carrier is regenerated. From the demodulator 431, the received signal is coupled to a de-spreader 433 wherein the PN sequence codes for the video signals are regenerated. From the de-spreader 433, the signals are coupled to an ADPCM decoder 434 which receives a two dimensional array of N-bit data or 128×128 by 2-bit data in contiguous frames and converts a first portion of this data into the received audio output signal for coupling in a conventional manner to audio circuitry (not shown) in the telephone set. The ADPCM decoder 434 also converts a second portion of the received 128×128 by 2-bit data into 128×128 by 6-bit frames for further coupling to the video frame selector 435. Before being coupled to the frame selector 435, however, these 6-bit frames are coupled through a delay unit 436. Since frames 0, 6, 12, etc. may arrive at the same time via different RF carriers, the delay unit 436 is used to delay these frames such that the frame selector 435 can re-order them in the desirable sequence. From the video frame selector 435, the signals are coupled to a digital-to-analog converter 437. At this converter, the signals are converted from a digital form to an analog form for generating the video image signal. From the converter 437, the video image signal is coupled to the display 410.

The frame selector 435 and the delay unit 436 together perform the reverse function of the modulo-7 frame allocator 416. The operations of ADPCM decoding, frame delay and frame selection in the receiver need not be in the same order as illustratively shown in FIG. 4. The same is true for the ordering of the ADPCM encoder 414 and modulo-7 frame allocator 416, also shown in FIG. 4.

The mobile radio telephone set 400 also includes a controller unit 450, as shown in FIG. 4. This controller unit 450 includes a program memory 451 which provides instructions to a central processor unit (CPU) 452 for controlling the various operating features and functions originating at the telephone set 400. This program memory 451 contains data for interpreting a plurality of codes representative of various control signals received from the cellular base station 102 and for generating codes to be transmitted to the base station 102, for suitable operation in the wideband CDMA system. A data memory 453 is utilized by the CPU 452 for storing and accessing data associated with performing the various functions and features programmed in the program memory 451. In the described embodiment, CPU 452 is a microprocessor, program memory 451 is read-only-memory (ROM) and data memory 453 is random-access-memory (RAM). These components are readily available from a number of semiconductor manufacturers such as Intel, Motorola, AMD and NEC.

In the mobile radio telephone set 400, using video data compression described herein above for this set, the signal-to-noise ratio may be computed for the PN sequence frequencies for various numbers of users in a system using this type of telephone set, as follows:

Assuming a video bandwidth of $$= 128 \times 128 \times 2 \text{ bits} \times \frac{30 \text{ frames per sec.}}{6}$$
$$= 128 \times 128 \times 10 \cong 150 \text{ KHz}$$

and a PN sequence frequency of 5 MHz, the signal-to-noise ratio may be computed as follows:

$$\frac{S}{N} = \frac{1}{(m-1)\left(\frac{0.150}{5}\right)}$$

therefore it is 33.33 or 15 dB for m=two users, and $$\frac{S}{N} = \frac{1}{\frac{1.35}{5}} \cong 3.7 \cong 6 \text{ dB}$$

for m=10 users.

These S/N ratios are comparable to the results obtained at the high frequency of 15 MHz without compression in the previous analysis.

If both video data compression and high frequency wideband CDMA (i.e., a sequence code of 15 MHz) are employed, the signal-to-noise ratio for various users may be computed as follows:

$$\frac{S}{N} = \frac{1}{(m-1)\left(\frac{0.15}{15}\right)}$$

The ratio is 100 or 20 dB for m=two users, and $$\frac{S}{N} = \frac{15}{25 \times 0.15} = 4 \cong 6 \text{ dB}$$

for m=26 users.

This shows further improvement in SIN ratio by another factor of 3 (from 33.33 to 100) for a two user system and an increase in the number of users by about two and a half times (10 users to 26 users) at a level of 6 dB.

Figure 5A:
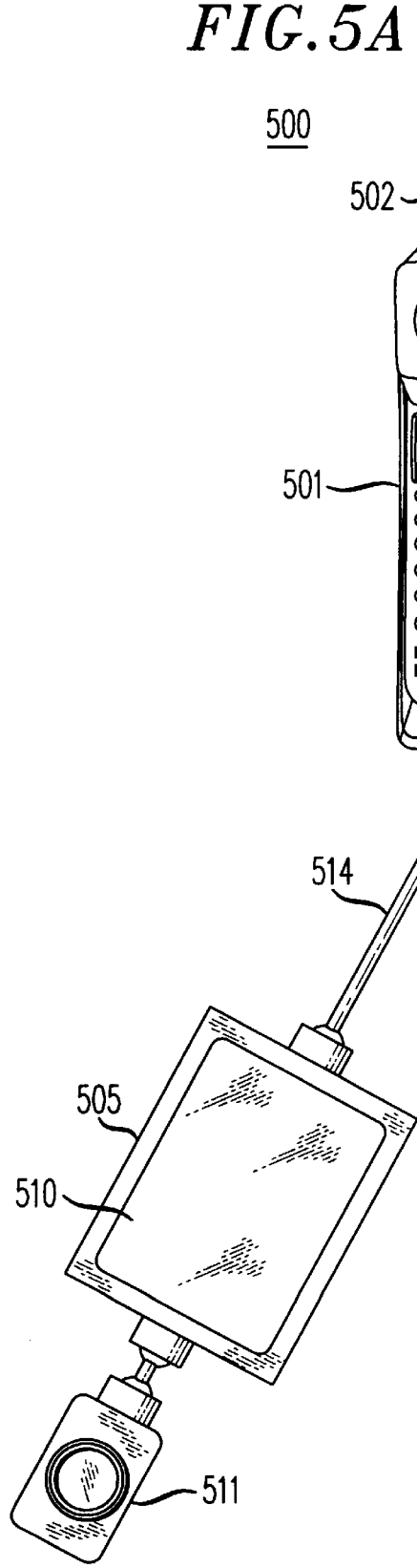
FIG. 5 shows a design for an alternative mobile telephone set suitable for use in the mobile radio telephone communication configuration shown in FIG. 1, in accordance with the principles of the invention.
Figure 5B:
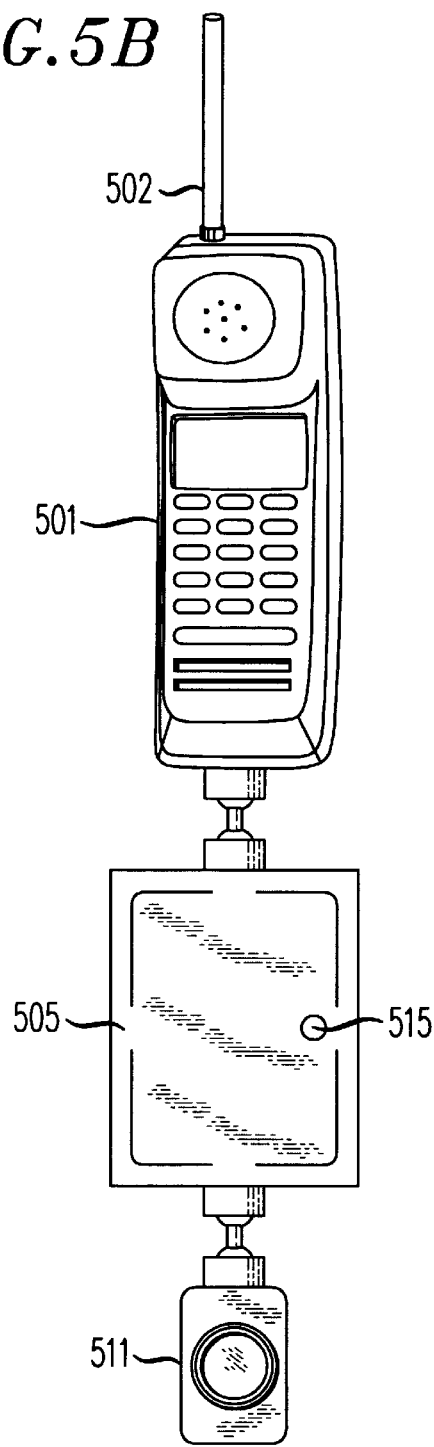

Referring next to FIGS. 5A and 5B, in combination, there is shown a design for an alternative mobile telephone set 500 suitable for use in the mobile radio telephone communication configuration shown in FIG. 1, in accordance with the principles of the invention. FIG. 5A is a view of the mobile radio telephone set 500 with the operable components thereof fully extended. FIG. 5B is a view of the mobile radio telephone set 500 with the operable components thereof fully collapsed.

As shown, the mobile radio telephone set 500 comprises a handset unit 501 with an RF antenna 502. The mobile radio telephone set 500 also comprises a camera display module 505 that is shown illustratively connected to the handset unit 502 by use of a motorized retractable arm 514 for adjusting the distance between a user of the handset unit 501 and the camera-display module 505. Alternatively, a manually adjustable gooseneck-type arm can be used to connect these two components. Yet another alternative is the use of a radio frequency video link for providing the communications between the handset unit 501 and the camera display module 505. As appreciated by those skilled in the art, such radio frequency technique is known and presently available commercially in many remote video monitoring systems.

Included in the camera display module 505 is a display 510 for showing a received visual image. Connected to the camera-display module is a camera 511 for capturing a visual image for transmission to a remote display device (not shown) through the radio frequency communication with the cellular base station 102. The camera is usable to acquire images of the user, while the display 510 provides real-time images of the person on the other side of the line. The display 510 may typically be a liquid crystal device (LCD) display. The lens unit for the camera (typically a CCD camera for transmitting black and white or color images) is typically comprised of a fixed focus wide-angle lens capable of acquiring images of the telephone set user from a distance of 6 to 8 inches from the mouth of the user. The camera 511 may be flipped around by 360° or rotated side to side to take images of the surroundings and transmit them to a remote party. The camera may also be detached from the camera display module 505 if needed, for example, when the cellular telephone is used to access the Internet.

Additionally, a switch 515 is provided on the side of the display unit to change the displayed image from that of the remotely located party to the image of the set user or his/her surroundings (to display the transmitted image as opposed to the received image).

Various other modifications of this invention are contemplated and may obviously be resorted to by those skilled in the art without departing from the spirit and scope of the invention as hereinafter defined by the appended claims.

I claim:

1. A mobile radio telephone set configurable for operation in a cellular telephone system, the telephone set comprising:

transmit and receive apparatus for establishing a wireless bi-directional voice and data communication path between the telephone set and a remotely located control center;

a controller for processing received and transmitted voice and data signals;

a video image display; and signal decoding circuitry responsive to said controller for recovering a plurality of data signals received via the wireless bi-directional voice and data communication path, each of the plurality of data signals being associated with one of a plurality of radio frequency (RF) downlink carriers, and converting the plurality of data signals into a video image signal for displaying in said video image display.

2. The mobile radio telephone set as in claim 1 further comprising a handset unit and a portable base unit connected to said handset unit via a conducting cable.

3. The mobile radio telephone set as in claim 1 further comprising a handset unit and a portable base unit connected to said handset unit via a bi-directional radio frequency link between said handset unit and said base unit.

4. The mobile radio telephone set as in claim 1 wherein said transmit and receive apparatus includes a transmit and receive antenna and a radio frequency transceiver.

5. The mobile radio telephone set as in claim 1 wherein said signal decoding circuitry includes a frequency division demultiplexer for extracting from said plurality of data signals a plurality of bit-sliced frames, each bit-sliced frame being respectively associated with one of the plurality of RF downlink carriers.

6. The mobile radio telephone set as in claim 5 wherein the plurality of bit-sliced frames is N, and said signal decoding circuitry further includes a video frame combiner for combining each of the N bit-sliced frames into a two dimensional array of N-bit frames.

7. The mobile radio telephone set as in claim 6 wherein a two dimensional array of 1-bit frames is extracted from said two dimensional array of N-bit frames to provide a voice data signal.

8. The mobile radio telephone set as in claim 1 wherein said signal decoding circuitry includes an adaptive differential pulse code modulation decoder for recovering a plurality of data signals, each of the data signals being associated with one of the plurality of RF downlink carriers and recovered as a two dimensional array of N-bit frames representative of said video image signal.

9. The mobile radio telephone set as in claim 8 wherein said signal decoding circuitry further includes a frame selector and a frame delay unit, the frame selector reordering said two dimensional arrays of N-bit frames in a desired sequence for displaying on the video image display and the frame delay unit providing a delay in the arrival of said two dimensional arrays of N-bit frames to the frame selector for facilitating said reordering in said frame selector.

10. The mobile radio telephone set as in claim 1, wherein the plurality of RF downlink carriers includes six RF downlink carriers each assigned to one of a plurality of video data signals and one RF downlink carrier assigned to an audio signal.

11. A mobile radio telephone set configurable for operation in a cellular telephone system, the telephone set comprising:

transmit and receive apparatus for establishing a wireless bi-directional voice and data communication path between the mobile radio telephone set and a remotely located control center;

a controller for processing received and transmitted voice and data signals;

a camera for obtaining a video image; and signal encoding circuitry responsive to said controller for converting said obtained video image into a plurality of data signals and associating each of said plurality of data signals with one of a plurality of radio frequency (RF) uplink carriers for transmitting said plurality of data signals from the telephone set, via the wireless bi-directional voice and data communication path.

12. The mobile radio telephone set as in claim 11 wherein said signal encoding circuitry includes a video digitizer and a sub-band sampler for converting said video image into bit frames.

13. The mobile radio telephone set as in claim 12 wherein said signal encoding circuitry further includes a bit slicer for parsing each bit frame into a plurality of bit-sliced frames.

14. The mobile radio telephone set as in claim 13 wherein said signal encoding circuitry still further includes a frequency division multiplexer for respectively assigning one of said plurality of RF uplink carriers to each one of said bit-sliced frames for transmitting a data signal representative of the bit-sliced frame via the wireless bi-directional voice and data communication path.

15. The mobile radio telephone set as in claim 12 wherein said signal encoding circuitry further includes an adaptive differential pulse code modulation encoder for converting said video image into contiguous bit frames.

16. The mobile radio telephone set as in claim 15 wherein said plurality of RF uplink carriers is N and said signal encoding circuitry still further includes a modulo-N frame allocator for respectively assigning each one of said plurality of RF uplink carriers to one of said contiguous frames.

17. The mobile radio telephone set as in claim 11 wherein said transmit and receive apparatus includes a transmit and receive antenna and a radio frequency tranceiver.

18. The mobile radio telephone set as in claim 11, wherein the plurality of RF uplink carriers includes six RF uplink carriers each assigned to one of a plurality of video data signals and one RF uplink carrier assigned to an audio signal.

19. A mobile radio telephone set configurable for operation in a cellular telephone system, the telephone set comprising:

transmit and receive apparatus for establishing a wireless bi-directional voice and data communication path between the mobile radio telephone set and a remotely located control center;

a controller for processing received and originated voice and video image signals;

a first video image display in said radio telephone set;

signal decoding circuitry responsive to said controller for recovering a first plurality of data signals received via the bi-directional voice and data communication path, each of the first plurality of data signals being associated with one of a plurality of radio frequency (RF) downlinkcarriers, and converting the recovered data signals into a first video image signal for displaying in said first video image display;

a camera for obtaining a second video image; and signal encoding circuitry responsive to said controller for converting said second video image into a second plurality of data signals and associating each of said second plurality of data signals with one of a plurality of radio frequency (RF) uplink carriers for transmitting said second plurality of data signals via the wireless bi-directional voice and data communication path.

* * * * *